(12) United States Patent
Edlund et al.

(10) Patent No.: US 9,515,334 B2
(45) Date of Patent: Dec. 6, 2016

(54) UTILIZATION-BASED FUEL CELL MONITORING AND CONTROL

(75) Inventors: David J. Edlund, Hopinkton, MA (US); Arne LaVen, Bend, OR (US); Mesa Scharf, Redmond, OR (US)

(73) Assignee: DCNS, La Montagne (FR)

( * ) Notice: Subject to any disclaimer, the term of this patent is extended or adjusted under 35 U.S.C. 154(b) by 494 days.

(21) Appl. No.: 13/168,034

(22) Filed: Jun. 24, 2011

(65) Prior Publication Data

US 2011/0250518 A1    Oct. 13, 2011

Related U.S. Application Data

(63) Continuation of application No. 11/109,489, filed on Apr. 18, 2005, now Pat. No. 7,985,510, which is a
(Continued)

(51) Int. Cl.
*H01M 8/00* (2016.01)
*H01M 8/04* (2016.01)
*H01M 8/06* (2016.01)

(52) U.S. Cl.
CPC ..... *H01M 8/04753* (2013.01); *H01M 8/04089* (2013.01); *H01M 8/04402* (2013.01);
(Continued)

(58) Field of Classification Search
CPC ............ H01M 8/04089; H01M 8/04402; H01M 8/04589; H01M 8/0612; H01M 8/0662; H01M 8/04753; Y02P 70/56; Y02E 60/50
(Continued)

(56) References Cited

U.S. PATENT DOCUMENTS

| 2,824,620 A | 2/1958 | De Rosset |
| 3,336,730 A | 8/1967 | McBride et al. |

(Continued)

FOREIGN PATENT DOCUMENTS

| EP | 0752731 B1 | 1/1997 |
| EP | 0828303 | 3/1998 |

(Continued)

OTHER PUBLICATIONS

English-language abstract of Japanese Patent No. 60-30062, 1985.
(Continued)

*Primary Examiner* — Milton I Cano
*Assistant Examiner* — Stephen Yanchuk
(74) *Attorney, Agent, or Firm* — Dascenzo Intellectual Property Law, P.C.

(57) ABSTRACT

Fuel cell systems and methods for controlling the operation of components of the fuel cell system, which may include a fuel source and a fuel cell stack. In some examples, a fuel source is adapted to provide supply fuel to a fuel cell stack at a supply pressure. The fuel cell stack produces electric current at a production amperage. In some examples, a control system is adapted to control operation of the fuel cell stack based on a pressure detected at the fuel cell stack. In some examples, a target production amperage is determined based on the detected pressure, such that when electric current is produced at the target production amperage for the detected pressure, the fuel cell stack consumes a predetermined proportion of the supply fuel.

19 Claims, 5 Drawing Sheets

Related U.S. Application Data continuation-in-part of application No. 10/857,629, filed on May 28, 2004, now Pat. No. 7,842,428, and a continuation-in-part of application No. 10/909,266, filed on Jul. 29, 2004, now Pat. No. 8,277,997.

(52) U.S. Cl.
CPC ..... *H01M 8/04589* (2013.01); *H01M 8/0612* (2013.01); *H01M 8/0662* (2013.01); *Y02E 60/50* (2013.01); *Y02P 70/56* (2015.11)

(58) Field of Classification Search
USPC .................................................. 429/428–432
See application file for complete search history.

(56) References Cited

U.S. PATENT DOCUMENTS

| | | |
|---|---|---|
| 3,338,681 A | 8/1967 | Kordesch |
| 3,350,176 A | 10/1967 | Green et al. |
| 3,469,944 A | 9/1969 | Bocard et al. |
| 3,607,419 A | 9/1971 | Keating, Jr. |
| 3,655,448 A | 4/1972 | Setzer |
| 3,765,946 A | 10/1973 | Werner et al. |
| 3,857,735 A | 12/1974 | Louis et al. |
| 3,877,989 A | 4/1975 | Waldman et al. |
| 3,920,416 A | 11/1975 | Houseman |
| 3,955,941 A | 5/1976 | Houseman et al. |
| 3,982,910 A | 9/1976 | Houseman et al. |
| 4,000,003 A | 12/1976 | Baker et al. |
| 4,003,343 A | 1/1977 | Lee |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,310,605 A | 1/1982 | Early et al. |
| 4,349,613 A | 9/1982 | Winsel |
| 4,351,405 A | 9/1982 | Fields et al. |
| 4,377,445 A | 3/1983 | Grimes |
| 4,387,434 A | 6/1983 | Moncrief, Jr. et al. |
| 4,390,602 A | 6/1983 | Struthers |
| 4,444,158 A | 4/1984 | Yoon |
| 4,468,235 A | 8/1984 | Hill |
| 4,472,176 A | 9/1984 | Rubin |
| 4,473,622 A | 9/1984 | Chludzinski et al. |
| 4,533,607 A | 8/1985 | Sederquist |
| 4,553,981 A | 11/1985 | Fuderer |
| 4,567,857 A | 2/1986 | Houseman et al. |
| 4,642,273 A | 2/1987 | Sasaki |
| 4,657,828 A | 4/1987 | Tajima |
| 4,781,241 A | 11/1988 | Misage et al. |
| 4,788,004 A | 11/1988 | Pinto et al. |
| 4,820,594 A | 4/1989 | Sugita et al. |
| 4,839,246 A | 6/1989 | Takabayashi |
| 4,839,574 A | 6/1989 | Takabayashi |
| 4,883,724 A | 11/1989 | Yamamoto |
| 4,904,548 A | 2/1990 | Tajima |
| 4,946,667 A | 8/1990 | Beshty |
| 4,981,676 A | 1/1991 | Minet et al. |
| 4,988,283 A | 1/1991 | Nagasawa et al. |
| 5,006,846 A | 4/1991 | Granville et al. |
| 5,030,661 A | 7/1991 | Lywood |
| 5,139,894 A | 8/1992 | Mizuno et al. |
| 5,154,986 A | 10/1992 | Takechi et al. |
| 5,200,278 A | 4/1993 | Watkins |
| 5,229,222 A | 7/1993 | Tsutsumi et al. |
| 5,334,463 A | 8/1994 | Tajima et al. |
| 5,354,547 A | 10/1994 | Rao et al. |
| 5,366,818 A | 11/1994 | Wilkinson et al. |
| 5,366,821 A | 11/1994 | Merritt et al. |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,462,815 A | 10/1995 | Horiuchi |
| 5,478,662 A | 12/1995 | Strasser |
| 5,509,942 A | 4/1996 | Dodge |
| 5,527,632 A | 6/1996 | Gardner |
| 5,624,768 A | 4/1997 | Tanokura |
| 5,631,532 A | 5/1997 | Azuma et al. |
| 5,631,820 A | 5/1997 | Donnelly et al. |
| 5,637,414 A | 6/1997 | Inoue et al. |
| 5,658,681 A | 8/1997 | Sato et al. |
| 5,677,073 A | 10/1997 | Kawatsu |
| 5,705,916 A | 1/1998 | Rudbeck et al. |
| 5,712,052 A | 1/1998 | Kawatsu |
| 5,714,276 A | 2/1998 | Okamoto |
| 5,763,113 A | 6/1998 | Meltser et al. |
| 5,771,476 A | 6/1998 | Mufford et al. |
| 5,780,179 A | 7/1998 | Okamoto |
| 5,795,666 A | 8/1998 | Johnssen |
| 5,798,186 A | 8/1998 | Fletcher et al. |
| 5,821,185 A | 10/1998 | White et al. |
| 5,846,669 A | 12/1998 | Smotkin et al. |
| 5,861,137 A | 1/1999 | Edlund |
| RE36,148 E | 3/1999 | Strasser |
| 5,897,766 A | 4/1999 | Kawatsu |
| 5,897,970 A | 4/1999 | Isomura et al. |
| 5,925,476 A | 7/1999 | Kawatsu |
| 5,927,416 A | 7/1999 | del Re et al. |
| 5,929,538 A | 7/1999 | O'Sullivan et al. |
| 5,932,181 A | 8/1999 | Kim et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,001,499 A | 12/1999 | Grot et al. |
| 6,007,931 A | 12/1999 | Fuller et al. |
| 6,013,385 A | 1/2000 | DuBose |
| 6,022,634 A | 2/2000 | Ramunni et al. |
| 6,042,956 A | 3/2000 | Lenel |
| 6,045,772 A | 4/2000 | Szydlowski et al. |
| 6,045,933 A | 4/2000 | Okamoto |
| 6,051,192 A | 4/2000 | Maston et al. |
| 6,054,229 A | 4/2000 | Hsu et al. |
| 6,083,637 A | 7/2000 | Walz et al. |
| 6,096,449 A | 8/2000 | Fuglevand et al. |
| 6,103,410 A | 8/2000 | Fuller et al. |
| 6,120,923 A | 9/2000 | Van Dine et al. |
| 6,165,633 A | 12/2000 | Negishi |
| 6,171,574 B1 | 1/2001 | Juda et al. |
| 6,214,484 B1 | 4/2001 | Hauer |
| 6,221,117 B1 | 4/2001 | Edlund et al. |
| 6,242,120 B1 | 6/2001 | Herron |
| 6,245,214 B1 | 6/2001 | Rehg et al. |
| 6,342,316 B1 * | 1/2002 | Okamoto et al. ............ 429/424 |
| 6,348,278 B1 | 2/2002 | LaPierre et al. |
| 6,383,670 B1 | 5/2002 | Edlund et al. |
| 6,421,593 B1 | 7/2002 | Kempen et al. |
| 6,423,203 B1 | 7/2002 | Faita et al. |
| 6,451,464 B1 | 9/2002 | Edlund et al. |
| 6,458,477 B1 | 10/2002 | Hsu |
| 6,495,277 B1 | 12/2002 | Edlund et al. |
| 6,522,955 B1 | 2/2003 | Colborn |
| 6,537,690 B1 | 3/2003 | Karrupaiah et al. |
| 6,703,722 B2 | 3/2004 | Christensen |
| 6,764,782 B2 | 7/2004 | Raiser et al. |
| 6,864,003 B2 | 3/2005 | Ueda et al. |
| 2001/0049038 A1 | 12/2001 | Dickman et al. |
| 2002/0020623 A1 | 2/2002 | Speranza et al. |
| 2002/0058175 A1 | 5/2002 | Ruhl |
| 2002/0072834 A1 | 6/2002 | Scheffler et al. |
| 2002/0102447 A1 | 8/2002 | Kato |
| 2002/0127447 A1 | 9/2002 | Edlund et al. |
| 2002/0182465 A1 | 12/2002 | Okamoto |
| 2002/0192518 A1 * | 12/2002 | Aoyagi et al. ............... 429/23 |
| 2003/0022043 A1 | 1/2003 | McElroy |
| 2003/0022044 A1 | 1/2003 | Inai |
| 2003/0113601 A1 | 6/2003 | Edlund et al. |
| 2004/0023083 A1 * | 2/2004 | Yang et al. .................. 429/13 |
| 2004/0080297 A1 | 4/2004 | Leboe |

(56) References Cited

U.S. PATENT DOCUMENTS

| | | |
|---|---|---|
| 2005/0026022 A1 | 2/2005 | Joos |
| 2005/0048335 A1* | 3/2005 | Fields et al. .................. 429/22 |
| 2005/0119842 A1 | 6/2005 | Clingerman et al. |

FOREIGN PATENT DOCUMENTS

| | | |
|---|---|---|
| EP | 1065741 A2 | 1/2001 |
| JP | 60-30062 | 2/1985 |
| JP | 02086069 | 3/1990 |
| JP | 4-163860 | 6/1992 |
| JP | H10-83824 | 3/1998 |
| JP | 20000067894 | 3/2000 |
| JP | 2002-231286 | 8/2002 |
| JP | 2002246051 | 8/2002 |
| WO | WO 98/56058 | 12/1998 |
| WO | WO 99/65097 | 12/1999 |
| WO | WO 00/02282 | 1/2000 |
| WO | WO 00/04600 | 1/2000 |

OTHER PUBLICATIONS

English-language abstract of Japanese Patent No. 4-163860, Jun. 1992.
English-language abstract of Japanese Patent No. 6176779, 1994.
English-language abstract of Japanese Patent No. 7057758, 1995.
English-language abstract of German language PCT Patent Publication No. WO 97/43796, 1997.
English-language abstract of German language PCT Patent Publication No. WO 98/56058, 1998.
English-language abstract of Japanese Patent No. 11116202, 1999.
English-language abstract of Japanese Patent No. 2-168803, 1999.
English-language abstract of Japanese Patent No. 63-236269, 1999.
English-language abstract of German language PCT Patent Application Serial No. WO 00/04600, 2000.
Edlund, David J. and William A. Pledger, "The Practical Use of Metal-Membrane Reactors for Industrial Applications," The 1995 Membrane Technology Reviews, pp. 89-97 (Nov. 1994).
Nadal, M. et al., "Development of a Hybrid Fuel Cell/Battery Powered Electric Vehicle," International Journal of Hydrogen Energy, vol. 21, No. 6, pp. 497-505, Jun. 1, 1996.
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.

* cited by examiner

UTILIZATION-BASED FUEL CELL MONITORING AND CONTROL

RELATED APPLICATIONS

This application is a continuation of and claims priority to U.S. patent application Ser. No. 11/109,489, which was filed on Apr. 18, 2005, and is entitled "Utilization-based Fuel Cell Monitoring and Control," now U.S. Pat. No. 7,985,510 and which is a continuation-in-part of and claims priority to U.S. patent application Ser. No. 10/857,629, which was filed on May 28, 2004 and is entitled Consumption-based Fuel Cell Monitoring and Control" now U.S. Pat. No. 7,842,428. The '489 application also is a continuation-in-part of and claims priority to U.S. patent application Ser. No. 10/909,266, which was filed on Jul. 29, 2004, and is entitled "Shared Variable-based Fuel Cell System Control" now U.S. Pat. No. 8,277,997. The complete disclosures of the above-identified patent applications are hereby incorporated by reference.

TECHNICAL FIELD

The present disclosure relates generally to fuel cell systems, and more particularly to systems and methods for determining and controlling one or more variables in a fuel cell system.

BACKGROUND OF THE DISCLOSURE

An electrochemical fuel cell is a device that converts fuel and an oxidant to electricity, a reaction product, and heat. For example, fuel cells may be adapted to convert hydrogen and oxygen into water, electricity, and heat. In such fuel cells, the hydrogen is the fuel, the oxygen is the oxidant, and the water is the reaction product.

A fuel cell stack typically includes two or more fuel cells, including groups of fuel cells, coupled together as a unit. A fuel cell stack may be incorporated into a fuel cell system. A fuel cell system also typically includes a fuel source, such as a supply of fuel and/or a fuel processor, which produces hydrogen gas or another suitable proton source for the fuel cell stack from one or more feedstocks. An example of a fuel processor is a steam reformer, which produces hydrogen gas from water and a carbon-containing feedstock. The system may also include a battery bank, which stores produced electrical power, and an air source, which delivers oxygen to the fuel cell. There is a need to control fuel cell stacks and other fuel cell system components to regulate the operation of the system, such as to prevent damage to the system and/or to operate the system efficiently in response to changing operating conditions.

SUMMARY OF THE DISCLOSURE

The present disclosure relates to energy producing and consuming assemblies and methods for monitoring fuel use and/or controlling the operation of fuel cell stacks based on fuel use. The energy producing and consuming assembly may include a fuel source adapted to provide supply fuel to a fuel cell stack at a supply pressure. The fuel cell stack may be adapted to produce electric current from at least a portion of the supply fuel at a production amperage. A control system may be adapted to detect a pressure at the fuel cell stack and to control the electric current production based at least in part on the detected pressure. The control system may be adapted to maintain the fuel utilization in a predetermined range by controlling the electric current produced by the fuel cell stack.

The energy producing and consuming assembly further may include an energy-storing/consuming device that applies a load to the fuel cell stack. The production amperage may be controlled by actively controlling the energy-storing/consuming assembly and/or the load applied to the fuel cell stack. The control system may also be adapted to control the production amperage by, additionally or alternatively, actively controlling the fuel source.

In some energy producing and consuming assemblies, the fuel utilization rate, or amount of fuel consumed per amount supplied, may be a function of the supply fuel feed rate and the load applied to the fuel cell stack. For example, for a fixed supply fuel feed rate, an increased applied load will increase the production of electric current and the fuel consumption, thereby increasing the fuel utilization rate. Similarly, a decreased applied load will decrease the production of electric current and decrease fuel consumption, thereby decreasing the fuel utilization rate.

In some assemblies, there is a predetermined maximum fuel utilization rate to prevent contamination of or other damage to the energy producing and consuming assemblies. Additionally, there may be a predetermined minimum fuel utilization rate to prevent excessive waste of the supply fuel. Controlling the fuel utilization rates by actively controlling the applied load may allow for improved responsiveness and greater control over the utilization rate. Actively controlling the applied load together with active control of the fuel source, based on the flow of unused fuel, may allow greater control of the fuel utilization rate over a wide range of operating conditions.

DETAILED DESCRIPTION AND BEST MODE OF THE DISCLOSURE

As has been mentioned, methods and systems are disclosed for controlling the operation of a fuel cell stack. As used herein, a fuel cell stack includes one or more fuel cells, whether individually or in groups of fuel cells, and typically includes a plurality of fuel cells coupled between common end plates. A fuel cell system includes one or more fuel cell stacks and at least one fuel source for the fuel cell stack(s). Additionally, an energy producing and consuming assembly includes one or more fuel cell stacks, at least one fuel source for the fuel cell stack(s), and at least one energy-storing/consuming assembly adapted to exert an applied load on the fuel cell stack.

Figure 1:
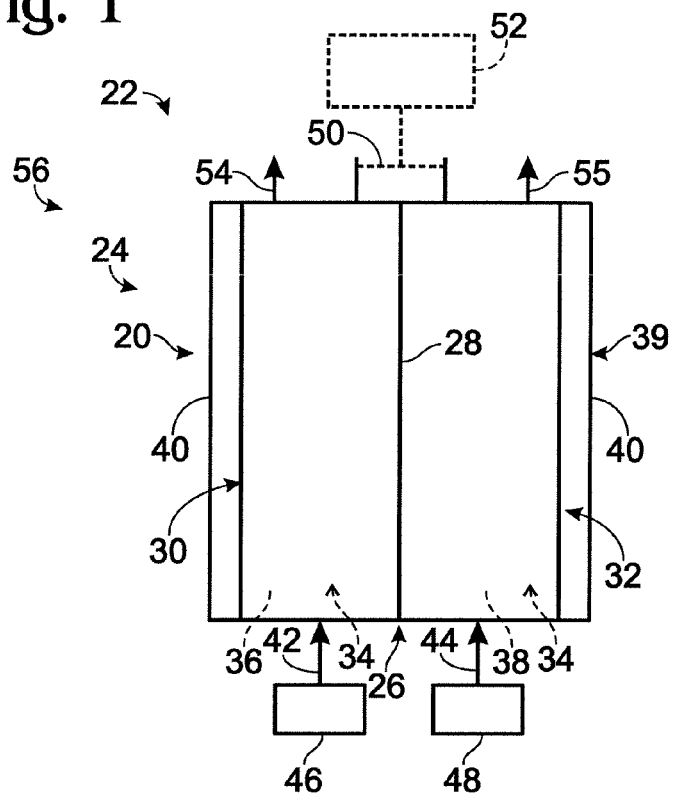
FIG. 1 is a schematic view of a fuel cell and associated fuel source, oxygen source, and energy-storing/consuming assembly.

The subsequently discussed fuel cell stacks and systems are compatible with a variety of different types of fuel cells, such as proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 1. The fuel cell may be described as forming a portion of a fuel cell system, such as generally indicated at 22, and/or a portion of a fuel cell stack, such as generally indicated at 24. Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cell 20 carry the relative voltage potential produced by the fuel cell.

In operation, fuel 42 is fed to the anode region, while oxidant 44 is fed to the cathode region. Fuel 42 may also be referred to as supply fuel 42. A typical, but not exclusive, fuel for cell 20 is hydrogen, and a typical, but not exclusive, oxidant is oxygen. As used herein, hydrogen refers to hydrogen gas and oxygen refers to oxygen gas. The following discussion may refer to fuel 42 as hydrogen 42 and oxidant 44 as oxygen 44, although it is within the scope of the present disclosure that other fuels and/or oxidants may be used.

Hydrogen 42 and oxygen 44 may be delivered to the respective regions of the fuel cell via any suitable mechanism from respective sources 46 and 48. Examples of suitable fuel sources 46 for hydrogen 42 include at least one pressurized tank, hydride bed or other suitable hydrogen storage device, and/or a fuel processor that produces a stream containing hydrogen gas. Examples of suitable sources 48 of oxygen 44 include a pressurized tank of oxygen or air, or a fan, compressor, blower or other device for directing air to the cathode region.

Hydrogen and oxygen typically combine with one another via an oxidation-reduction reaction. Although membrane 28 restricts the passage of a hydrogen molecule, it will permit a hydrogen ion (proton) to pass therethrough, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 1.

In practice, a fuel cell stack typically contains a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device, an energy-storing device, the fuel cell system itself, the energy-storing/consuming assembly, etc.

An energy producing and consuming assembly, which is illustrated generally in FIG. 1 at 56, includes at least one fuel cell system 22 and at least one energy-storing/consuming assembly 52, which is adapted to exert an applied load to, or upon, the fuel cell system, and which also may be referred to herein as a load applying assembly. The at least one energy-storing/consuming assembly 52 may be electrically coupled to the fuel cell, or more typically, the fuel cell stack. Assembly 52 applies a load to the cell/stack/system and draws an electric current therefrom to satisfy the load. This load may be referred to as an applied load, and may include thermal and/or electrical load(s). As used herein, the terms "energy-storing/consuming assembly" and "load applying assembly" may be used interchangeably to refer to one or more components adapted to apply a load to the fuel cell, the fuel cell stack, or the fuel cell system. Load applying assembly (or energy-storing/consuming assembly) 52 may include at least one energy-storage device 86. Additionally or alternatively, load applying assembly 52 may include at least one energy-consuming device 84. Illustrative examples of components that may be included in energy-storing/consuming, or load applying, assemblies 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, batteries, inverters, and even the balance-of-plant electrical requirements for the fuel cell system of which stack 24 forms a part. Load applying assemblies 52 may include additional and/or different components that may be adapted to apply a load to the fuel cell system.

In cathode region 32, electrons from the external circuit and protons from the membrane combine with oxygen to produce water and heat. Also shown in FIG. 1 are an anode purge or discharge stream 54, which may contain hydrogen gas, and a cathode air exhaust stream 55, which is typically at least partially, if not substantially, depleted of oxygen. It should be understood that fuel cell stack 24 will typically have common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

Figure 2:
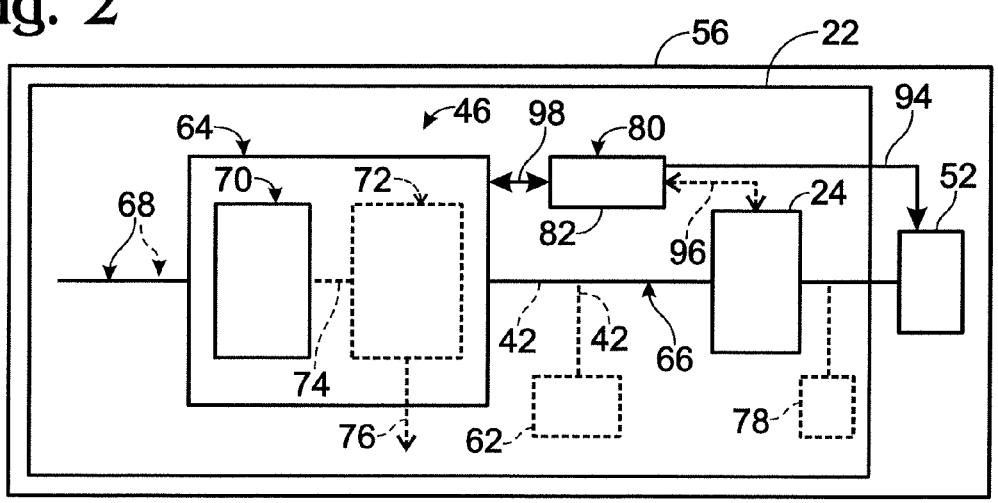
FIG. 2 is a schematic view of an energy producing and consuming assembly including a fuel cell stack, a fuel source, a control system, and an energy-storing/consuming assembly.

As discussed above, many fuel cell stacks utilize hydrogen gas as a reactant, or fuel. Therefore, a fuel cell stack 24 may be coupled with a source 46 of hydrogen gas 42 (and related delivery systems and balance-of-plant components) to form a fuel cell system 22. An illustrative example of a fuel cell system is schematically illustrated in FIG. 2. As discussed previously with respect to FIG. 1, examples of sources 46 of hydrogen gas 42 include a storage device 62 that contains a stored supply of hydrogen gas, as indicated in dashed lines in FIG. 2. Examples of suitable storage devices 62 include pressurized tanks and hydride beds. An additional or alternative source 46 of hydrogen gas 42 is the product stream from a hydrogen-producing fuel processor, which produces hydrogen by reacting a feed stream to produce the stream containing hydrogen gas 42 or to produce reaction products from which the stream containing hydrogen gas 42 is formed, such as after one or more purification steps.

As shown in solid lines in FIG. 2, fuel cell system 22 includes at least one fuel source 46, such as fuel processor 64, and at least one fuel cell stack 24. Fuel processor 64 is adapted to produce a product hydrogen stream 66 containing hydrogen gas 42 from a feed stream 68 containing one or more feedstocks. The fuel cell stack is adapted to produce an electric current from the portion of product hydrogen stream 66 delivered thereto. In the illustrated example, a single fuel processor 64 and a single fuel cell stack 24 are shown; however, more than one of either or both of these components may be used. While these components have been schematically illustrated, the fuel cell system may include additional components that are not specifically illustrated in the Figures, such as air delivery systems, heat exchangers, sensors, flow-regulating devices, heating assemblies and the like.

As also shown, hydrogen gas may be delivered to stack 24 from one or more of fuel processor 64 and storage device 62, and hydrogen from the fuel processor may be delivered to one or more of the storage device and stack 24. Some or all of stream 66 may additionally, or alternatively, be delivered, via a suitable conduit, for use in another hydrogen-consuming process, burned for fuel or heat, or stored for later use.

Fuel processor 64 includes any suitable device that produces hydrogen gas from one or more feed streams. Accordingly, fuel processor 64 may be described as including a hydrogen-producing region 70 in which a stream that is at least substantially comprised of hydrogen gas is produced from one or more feed streams. Examples of suitable mechanisms for producing hydrogen gas from feed stream(s) 68 include steam reforming and autothermal reforming, in which reforming catalysts are used to produce hydrogen gas from a feed stream containing water and at least one carbon-containing feedstock. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Feed stream 68 may be delivered to fuel processor 64 via any suitable mechanism and/or via any suitable feedstock delivery system. Although only a single feed stream 68 is shown in solid lines in FIG. 2, it is within the scope of the present disclosure that more than one stream 68 may be used (as schematically illustrated in dashed lines) that these streams may contain the same or different feedstocks. As used herein, the term "fuel processing assembly" may be used to refer to the fuel processor and associated components of the fuel cell system, such as feedstock delivery systems, heating assemblies, separation and/or purification regions or devices, air delivery systems, fuel delivery systems, fluid conduits, heat exchangers, fuel processor controllers, etc. All of these illustrative components are not required to be included in any fuel processing assembly or used with any fuel processor according to the present disclosure. Similarly, other components may be included or used.

In many applications, it is desirable for the fuel processor to produce at least substantially pure hydrogen gas. Accordingly, the fuel processor may utilize a process that inherently produces sufficiently pure hydrogen gas. Alternatively, the fuel processing assembly and/or the fuel processor may include one or more suitable purification and/or separation devices that remove impurities from the hydrogen gas produced in the fuel processor. When region 70 does not produce pure hydrogen gas, stream 66 may include one or more of such illustrative impurities as carbon monoxide, carbon dioxide, water, methane, and unreacted feedstock. As another example, the fuel processing system or fuel cell system may include one or more purification and/or separation devices downstream from the fuel processor. This is schematically illustrated in FIG. 2, in which a separation region 72 is shown in dashed lines. When fuel processor 64 includes a separation region 72, the hydrogen-producing region may be described as producing a mixed gas stream that includes hydrogen gas and other gases, with hydrogen gas typically being the majority component of the mixed gas stream. Many suitable separation regions will produce from this mixed gas stream at least one product stream, such as stream 66, that contains at least substantially pure hydrogen gas and at least one byproduct stream that contains at least a substantial portion of the other gases. A mixed gas stream and a byproduct stream are schematically illustrated in FIG. 2 at 74 and 76, respectively. The separation region, or regions, may be housed with the hydrogen-producing region within a common shell, attached to the fuel processor, or positioned separate from the fuel processor (but still in fluid communication therewith).

Separation region 72 may utilize any process or mechanism for increasing the purity of the hydrogen gas and/or decreasing the concentration of one or more other gases (such as carbon monoxide and/or carbon dioxide) that may be mixed in with hydrogen gas. Illustrative examples of suitable processes include one or more of chemical separation processes, in which one or more of the other gases are selectively adsorbed or reacted and thereby separated from the hydrogen gas, and physical separation processes, in which an adsorbent material or a membrane separation member is used to selectively divide the mixed gas stream into the at least one product and byproduct streams. Examples of suitable physical separation processes include pressure-driven separation processes, in which the mixed gas stream is delivered into contact with suitable separation member under pressure, with the pressure differential between the mixed gas region and at least one permeate or product region of the separation region driving the separation process.

An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions (to produce hydrogen gas and carbon dioxide from water and carbon dioxide).

Non-exclusive examples of suitable pressure-driven separation processes include the use of one or more hydrogen-selective membranes and the use of a pressure swing adsorption system. Illustrative examples of suitable hydrogen-selective membranes include membranes formed from palladium or palladium alloys, such as alloys of palladium and copper or silver. The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membranes may be made thinner, with commensurate increase in hydrogen flux.

The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents. An example of a suitable structure for use in separation region 72 is a membrane module, which contains one or more hydrogen permeable membranes. Examples of suitable hydrogen-selective membranes, methods for forming and utilizing the membranes, and separation devices that include one or more hydrogen-selective membranes are disclosed in U.S. Pat. Nos. 6,319,306, 6,537,352, and 6,562,111, the complete disclosures of which are hereby incorporated by reference for all purposes.

Another example of a suitable pressure-separation process for use in separation region 72 is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from the mixed gas stream.

In the context of a fuel cell system, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Illustrative, nonexclusive examples of suitable fuel processors are disclosed in U.S. Pat. Nos. 6,221,117, 5,997,594, 5,861,137, and pending U.S. Patent Application Publication No. 2001/0045061. The complete disclosures of the above-identified patents and patent application are hereby incorporated by reference for all purposes.

FIG. 2 also schematically depicts that fuel cell systems 22 may (but are not required to) include at least one energy-storage device 78. Device 78 is adapted to store at least a portion of the current produced by fuel cell stack 24. More particularly, the current may establish a reserve that can be later used to satisfy an applied load, such as from energy-storing/consuming assembly 52 and/or fuel cell system 22. Energy-storing/consuming assembly 52 may be adapted to apply its load to one or more of stack 24 and energy-storage device 78. An illustrative example of a suitable energy-storage device 78 is a battery, but others may be used. Energy-storage device 78 may additionally or alternatively be used to power the fuel cell system during startup of the system. It is within the scope of the present disclosure that the energy-storage device 78 may be adapted to apply a load to the fuel cell stack 24. In which case, energy-storage device 78 is another illustrative example of, or another illustrative example of a component of, a load applying assembly or energy-storing/consuming assembly. It is within the scope of the present disclosure that energy producing and consuming assembly 56 include more than one load applying assembly 52.

Also shown in FIG. 2 is a control system 80 with a controller 82 that is adapted to control the operation of the energy-storing/consuming assembly 52 and that may also be adapted to control the operation of the fuel cell stack 24 and/or the fuel source 46. The performance of energy producing and consuming assembly 56 is regulated and automatically adjusted responsive to operating parameters and changes in the operating parameters detected by control system 80.

Controller 82 is illustrated in FIG. 2 as being implemented as a unit. It may also be implemented as separate controllers, such as a controller for the energy-storing/consuming assembly, a controller for the fuel cell stack, and a controller for the fuel source. Such separate controllers, then, can communicate with each other via appropriate communication linkages. Control system 80 may include one or more analog or digital circuits, logic units or processors for operating programs stored as software in memory, and, as has been mentioned, may include one or more discrete units in communication with each other.

In the illustrative example shown in FIG. 2, controller 82 communicates with energy-storing/consuming assembly 52 via communication linkage 94, and may communicate with fuel cell stack 24 and fuel source 46 via appropriate communication linkages 96 and 98, respectively. Other linkages not shown also may be used. For example, there may be linkages to oxygen source 48, hydrogen storage device 62, etc. Linkages 94, 96, and 98 enable at least one-way communication with the controller. Alternatively, one or more of the linkages may enable two-way communication with the controller, thereby enabling the controller to measure or monitor selected values, or selected variables, of assembly 52, stack 24, and source 46, while also controlling the operation of these units, typically responsive to one or more of the measured values. The linkages may include any suitable interface, actuator and/or sensor for effecting the desired monitoring and control. Control system 80 may also include or communicate to with sensors, switches, feedback mechanisms, other electrical and/or mechanical circuits, and the like. Values of fuel cell stack 24 that may be detected include pressure at one or more points in the stack, stack current, stack voltage, applied load, fuel supply pressure, unused fuel flow, unused fuel pressure, stack temperature, water conductivity, air flow, and exhaust conditions.

Examples of values that may be monitored for a fuel source 46 in the form of a fuel processor 64 include the mode of operation of the fuel processor, the supply of feedstock, the rate at which hydrogen gas is being produced, the operating temperature, and the stoichiometry of the chemical process for producing fuel. An example of a monitored value for oxygen source 48 is the rate at which air is being supplied to the fuel processing assembly and the fuel cell stack. When oxygen source 48 is incorporated into either or both of the fuel source and/or fuel cell stack, its operation and measurement will typically be incorporated into the corresponding linkage for the unit into which it is incorporated.

An example of values that may be monitored in the energy-storing/consuming assembly 52 is the applied load exerted on the fuel cell stack. Not all of these values are necessarily essential, and other values may be measured as well, depending on the particular requirements and configuration of the energy producing and consuming assembly, the complexity of the assembly, the desired level of control, and particular user preferences. Control system 80 will be described in greater detail in connection with subsequent figures.

Typical modes, or states, of operation for a fuel processor include start-up, shutdown, idle, running (active, hydrogen-producing), and off. In the off operating state, the fuel processor is not producing hydrogen gas and is not being maintained at suitable operating conditions to produce hydrogen gas. For example, the fuel processor may not be receiving any feed streams, may not be heated, etc.

In the start-up operating state, the fuel processor is transitioning from the off state to its running operating state, in which the fuel processor is at its desired operating parameters for producing hydrogen gas, is receiving feedstock(s) and producing more than a nominal flow of hydrogen gas therefrom for delivery to the fuel cell stack and/or hydrogen-storage device. Accordingly, in the start-up state, the fuel processor is being brought to the desired operating conditions, such as temperature and pressure, for producing hydrogen gas. For example, fuel processors in the form of steam reformers typically operate at temperatures in the range of 200° C. and 800° C., and at pressures in the range of 50 psi and 1000 psi (gauge), although temperatures and pressures outside of these ranges are within the scope of the disclosure, such as depending upon the particular type and configuration of fuel processor being used.

In the standby, or idle, operating state, the fuel processor is not producing any hydrogen gas, or may be producing a nominal flow of hydrogen gas, with this flow typically not being delivered to the fuel cell stack or hydrogen-storage device. Instead, any produced hydrogen gas (or other output stream) is typically vented or utilized as a combustible fuel in a burner or other heating assembly, which may be adapted to maintain the fuel processor at or near a suitable temperature or within a selected range of temperatures for producing hydrogen gas. However, in the idle operating state, the fuel processor is typically maintained at the desired operating parameters for producing hydrogen gas such that, upon the occurrence of one or more predetermined operating conditions, the fuel processor may be returned to its running operating state. It is within the scope of the present disclosure that, in the idle operating state, the above-discussed nominal flow of hydrogen, when present, is sufficient to produce enough electric current to power the fuel cell system and/or recharge the system's energy-storage device. In the shutdown operating state, the fuel processor is transitioning to its off operating state, such as from its running or idle operating states.

Figure 3:
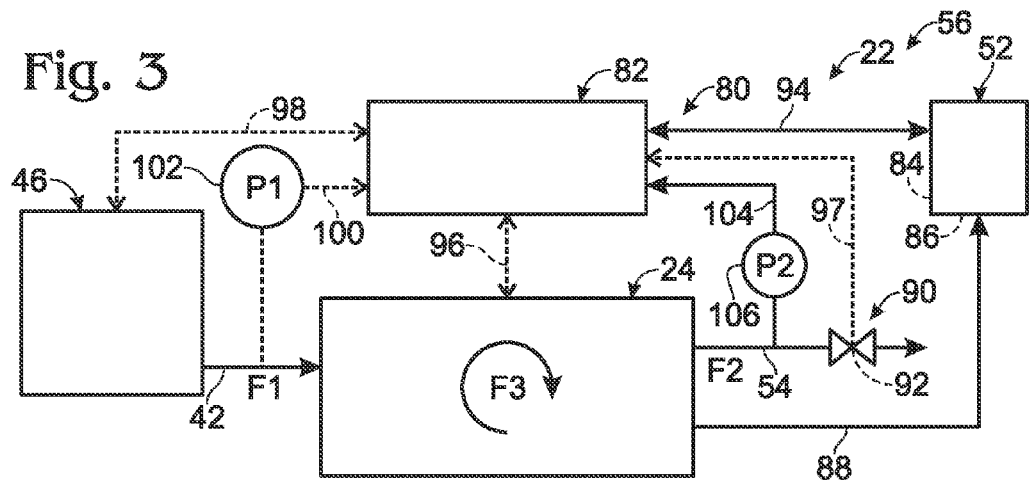
FIG. 3 is a schematic view of another example of an energy producing and consuming assembly including a fuel cell stack, a fuel source, a control system, and an energy-storing/consuming assembly.

FIG. 3 is a schematic view of energy producing and consuming assembly 56 adapted to include fuel cell stack 24, fuel source 46, and control system 80. Supply fuel 42 flows, with a supply pressure P1 and as supply flow F1, from fuel source 46 to the anode region(s) of fuel cell stack 24. Stack 24 processes at least a portion F3 of flow F1 to produce electrical power. The remaining unused fuel, referred to as flow F2, is discharged from the stack as discharge stream 54, through at least one exit orifice 90. Accordingly, the fuel flow in fuel cell stack 24 can be represented by the equation F1=F2+F3.

The discharge of unused fuel from fuel cell stack 24 may be continuous or may be intermittent. In either embodiment, the production of unused fuel F2 may be considered to be a continuous flow even though the physical discharge through stream 54 may be only intermittent. In the case of intermittent physical discharge of unused fuel F2, the flow of unused fuel accumulates in fuel cell stack 24 until discharged. The timing between intermittent discharges may be set to a predetermined period or may be controlled by control system 80 via controller 82 or other controller.

Fuel cell stack 24 is electrically coupled to an energy-storing/consuming assembly 52 via a suitable conductor 88 or series of conductors and circuits. Energy-storing/consuming assembly 52 may include one or more energy-consuming devices 84 and/or one or more energy-storage devices 86, as described above. Energy-storing/consuming assembly 52 may be adapted to exert an applied load on fuel cell stack 24, as discussed herein.

As illustrated, controller 82 is adapted to communicate via a linkage 104 with a pressure gauge 106 that is adapted to detect pressure P2 of the unused fuel discharged from fuel cell stack 24 in discharge stream 54. Pressure gauge 106 may also be adapted to detect pressure P2 of the unused fuel (building up) in fuel cell stack 24, such as in intermittent discharge configurations. As used herein, references to pressure gauge 106 detecting exit pressure P2 or other references to exit pressure P2 are intended to refer to either the pressure in the discharge stream 54 or the pressure at the fuel cell stack, depending on the configuration of the energy producing and consuming assembly.

Similarly, control system 80 may include a linkage 100 to communicate with pressure gauge 102, which is adapted to detect pressure P1 of the supply fuel 42 in supply flow F1. Pressure gauge 102 may be adapted to detect pressure P1 at the fuel cell stack inlet to detect pressure changes within fuel cell stack 24. As with pressure gauge 106 and exit pressure P2, references herein to pressure gauge 102 and supply pressure P1 are intended to refer to pressures detected either at the fuel cell stack or between the fuel cell stack and the fuel source, depending on the configuration of the energy producing and consuming assembly.

In some examples of energy producing and consuming assembly 56 according to the present disclosure, including those with continuous discharge of unused fuel, the pressure drop across fuel cell stack 24 is minimal. Therefore, supply pressure P1, exit pressure P2, and the pressure of the fuel cell stack may be substantially the same. Similarly, in intermittent discharge assemblies, the pressure in the fuel cell stack may be substantially the same as the supply pressure P1 due to back pressure applied on the fuel inlet. Accordingly, while figures and descriptions herein may specifically reference exit flows, exit pressures, supply pressures, supply flows, fuel cell stack pressures, etc., all such references and descriptions are intended to refer generally to measuring a pressure or flow at the fuel cell stack, either within the stack or in fluid communication with the stack. As discussed below, it is within the scope of the present disclosure that the references to pressure and/or flow at the fuel cell stack include pressures or flows measured before or after a pressure relief valve or pressure regulator on the supply flow F1. Therefore, while within the scope of the present disclosure, pressures and/or flows associated with the fuel cell stack may be measured prior to delivery to the stack and/or after being removed from the stack. The specific embodiments described below are illustrative only.

Control system 80 and controller 82 may include additional controllers and linkages. Additionally, not all of these illustrative communication linkages and interrelationships are required. As illustrative, non-exclusive examples, some embodiments may not measure the pressure of the supply fuel and/or there may be no linkage to the fuel source.

As discussed above, energy producing and consuming assembly 56 and fuel cell system 22 may be adapted to discharge unused fuel from fuel cell stack 24 in different modes. These modes include at least a continuous bleed mode and an intermittent, or purge-based, mode. In a continuous bleed mode, unused fuel is discharged continuously and concurrently from the fuel cell stack 24 during production of electricity by the fuel cell stack. In an intermittent mode, unused fuel is discharged periodically and may be discharged in a manner tending to purge the fuel cell stack.

In some fuel cell systems 22 operated in a continuous bleed mode, exit orifice 90 may have a fixed size and/or flow characteristics (including a combination of orifices having a combined size and flow characteristic) appropriate for a particular application, and the exit pressure and flow depend on the supply pressure and flow consumed by the fuel cell. As an example, an exit orifice size of less than 0.1 inch in diameter, such as 0.033 inches in diameter, or another selected (collective) size in the range of 0.02-0.07 inches in diameter may be used. Although circular orifices having particular diameters are mentioned, the exit orifice, as a single orifice or combination of orifices, may have any appropriate individual and/or collective cross-sectional size, shape and/or flow characteristics suitable for use in a particular system and/or application.

In other examples of fuel cell systems 22 operated in a continuous bleed mode, control system 80 may be adapted to control the size of at least one of the one or more exit orifices. As illustrated schematically in FIG. 3, controller 82 may optionally be coupled to exit orifice 90 via communication linkage 97. In such an example, exit orifice 90 may include an orifice adjusting valve 92. By controlling the size of the exit orifice, the rate of unused fuel flow in discharge stream 54 is controlled, and the exit pressure P2 is controlled. In some fuel cell systems 22, a change in the exit pressure produces a corresponding change in the supply pressure P1. Controlling the size of the exit orifice is one example of a way to actively control one variable in the energy producing and consuming assembly to affect the function of at least one other component. For example, reducing the size of exit orifice 90 reduces the discharge rate, which, in some assemblies, may increase the utilization rate. Although referred to herein simply as an exit orifice, it is within the scope of the present disclosure that more than one orifice may be used, and/or that two or more outlets or other apertures may collectively be referred to as the exit orifice.

In some examples of fuel cell systems 22 operated in intermittent mode, orifice 90 is kept closed or at least substantially closed between discharges of unused fuel. The fuel cell stack then is operated so that fuel is supplied at a rate that matches or nearly matches consumption.

During purging or discharging of the fuel cell, valve 92 may be opened wide so that fuel can flow rapidly through exit orifice 90. Although not required, the period between purges can be much longer than the duration of discharge. As an example, a purge of one second may take place every thirty seconds of operation of the fuel cell stack. If one liter of fuel is discharged during each purge, and 49 liters of fuel are consumed in the production of electricity between purges, the fuel cell stack is utilizing 98 percent of the fuel. As such, the fuel cell stack may be described as having 98% utilization of the fuel.

The duration of each purge, the frequency of the purges, or both, are varied in some fuel cell systems, such as by coupling controller 82 to exit orifice 90 via communication linkage 97. The varying of the frequency and/or duration of purges may provide for control of the utilization of the fuel. An increase in either the duration or frequency of the purges produces a corresponding decrease in the utilization of fuel, for given operating conditions of the fuel cell system. In other examples, changing the frequency and/or duration of purges may be made to maintain a selected utilization level. For example, at reduced levels of consumption of fuel by the fuel cell stack, or at reduced supply fuel pressures P1, purges may be of shorter duration and/or decreased frequency. Conversely, at higher levels of consumption and/or higher supply fuel pressures, purges may be of longer duration and/or increased frequency. Included within the scope of the present disclosure are intermittent purge operations in which the frequency or duration of the purges are actively controlled based on one or more variables of the energy producing and consuming assembly, such as the amount of fuel consumed by the fuel cell stack or the current produced by the fuel cell stack.

As discussed above, control system 80 may be configured to monitor one or more variables of the energy producing and consuming assembly, including values associated with the fuel source, the fuel cell stack, or the energy-storing/consuming assembly. By "associated with," it is meant that the control system (and/or controller) is adapted to measure, calculate, or otherwise detect, directly or indirectly, the variable of the corresponding stream or component. The value of the measured variable may be directly inputted to the control system. However, it is within the scope of the present disclosure that the control system (and/or controller) is adapted to receive an input that is representative of, or derived from, the measured value of the variable, such as a digital representation thereof, an error signal indicative of the value of the variable based upon a threshold or prior value thereof, a normalized or scaled value of the measured variable, etc.

As discussed in more detail herein, the controller may be adapted to control the operation of one or more functional components of the fuel cell system, such as the operation of the fuel processor and the fuel cell stack responsive (at least in part) to a variable, such as a variable associated with the hydrogen stream. While a given variable may be more closely associated with a particular component, a variable may directly or indirectly affect two or more components. For example, the pressure of a feedstock stream to a fuel processor may be most closely related to the fuel source, but indirectly affects the ability of the fuel cell stack to produce electric current. As used herein, variables that have an effect on two or more functional components may be referred to as a "common variable," which may also be referred to as a shared variable or a mutual variable. An illustrative (non-exclusive) example of such a variable is the pressure of the hydrogen (or other fuel) stream 66 that is produced by the fuel processor and consumed by the fuel cell stack.

With continuing reference to FIG. 3, in some configurations of the present disclosure, control system 80 may be adapted to control the operation of the fuel cell system, including fuel source 46 and fuel cell stack 24 based at least in part upon a variable, which may be common to, or associated with, both source 46 and stack 24. More particularly, control system 80 may be adapted to control, responsive at least in part upon inputs associated with the value of a variable, the operating states of the fuel processor and the fuel cell stack. This control may be more than simply shutting down or starting up the system responsive to a variable value that exceeds a particular threshold. For example, control system 80 may be adapted to monitor a variable and maintain the fuel cell system in an active operating state, in which the fuel processor is producing fuel (such as hydrogen gas) and the fuel cell stack is receiving the fuel and an oxidant and producing an electric current, such as to satisfy an applied load, therefrom. The control system may be adapted to regulate the active operating state of the fuel processor and the fuel cell stack to maintain the fuel cell system in an active operating state based at least in part upon the measured value representative of the variable. As such, this control may include one or more of limiting the applied load to the fuel cell system and regulating the rate of production of hydrogen gas (or other fuel) to maintain the value of the variable within a selected range of values and thereby maintain the fuel cell system in an active operating state. In such an embodiment, the control system (and/or controller) may be described as controlling the operation of the fuel cell system to maintain a given variable, such as the pressure of the hydrogen (or other fuel stream), within selected threshold values.

As used herein, when control system 80 (and/or controller 82) is described as controlling the operation or operating state of the fuel processor or the fuel cell stack, this control may be and/or may include controlling the operation of components of the fuel processing assembly (fuel processor and/or components associated with the fuel processor) or fuel cell system (fuel cell stack and/or components associated with the fuel cell stack). As an illustrative example, the operation of the fuel processor may be controlled by regulating one or more of the rate at which a carbon-containing or other feedstock is delivered to the fuel processor (such as by controlling the operation of a feedstock delivery system adapted to deliver the feedstock to the fuel processor), the operating of a burner or other heating assembly adapted to heat the fuel processor, the pressure of the fuel processor, etc. As a related example, the operation of the fuel cell stack may be controlled by regulating one or more of the flow of oxidant and/or hydrogen gas to the fuel cell stack, a cooling or other heat-exchange assembly associated with the stack, the load applied to the stack, etc.

In some examples, control system 80 may be adapted to control fuel source 46 and/or fuel cell stack 24, based at least in part on the flow of supply fuel to the fuel cell stack. For example, the production of supply fuel may be controlled by controlling the stoichiometry of the associated chemical process and/or the production efficiency of a fuel processing assembly, and/or by controlling the release of supply fuel from a storage device, and/or by adjusting the operating state, rate of production, etc. of fuel source 46 as required to meet the electrical load of energy-storing/consuming assembly 52. In some examples of fuel cell systems, the flow F1 of fuel is not readily measured directly. In such examples, then, flow F1 may be determined indirectly by determining the fuel consumed by the stack, represented by flow F3, and the flow F2 of unused fuel discharged from orifice 90.

As an additional example, control system 80 may be described as being adapted to detect the level of electrical power produced, to determine a target supply pressure at which the fuel cell stack consumes a given proportion of the supply fuel for a given level of electrical power produced by the fuel cell stack, and to control operation of the fuel cell stack based on the target supply pressure. For example, the fuel source and/or the fuel cell stack may be controlled to maintain the fuel supply or exit pressure at about the target pressure. Further, the control system may be further adapted to control operation of the fuel source in a manner tending to change the supply or exit pressure to the target pressure. A change in the electrical power produced by the fuel cell stack may be detected, and the target supply pressure may then be changed based on the detected change in the electrical power. In examples where the fuel source is adapted to produce the supply fuel from one or more feedstocks, the control system may be adapted to control use of the feedstocks by the fuel source based on the determined target pressure and/or based on a determined flow of supply fuel. In examples where the fuel source includes a fuel processor that produces the supply fuel, the control system may be adapted to determine the stoichiometry of the chemical process based on the determined flow of supply fuel, and control production of the supply fuel based on the determined stoichiometry.

Figure 4:
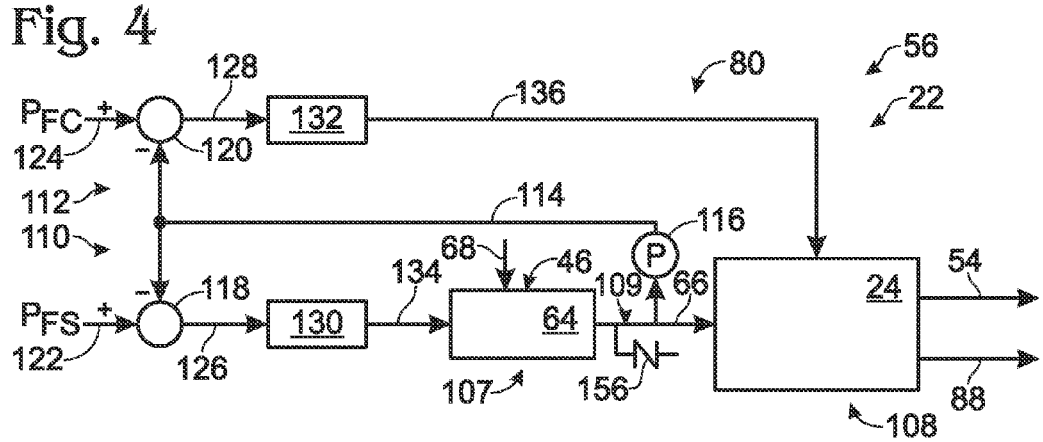
FIG. 4 is a schematic view of another example of an energy producing and consuming assembly that includes a fuel cell stack, a fuel source, and a control system.

FIG. 4 illustrates an example of an energy producing and consuming assembly 56, in which the functioning or operation of a first component 107 and of a second component 108 both affect a variable 109. In some of the following illustrative examples, variable 109 is, or includes, the pressure P of hydrogen gas 42 in a fuel stream 66, or the pressure P at fuel cell stack 24. As discussed, it is within the scope of the present disclosure that other variables may be utilized, including one or more of those described above. In the following example, the first and second components 107, 108 are illustrated and discussed as fuel processor 46 and fuel cell stack 24, one or more of which may be controlled by control system 80 based upon the value of variable 109. As discussed in more detail herein, the fuel processor and fuel cell stack are not exclusive pairs of first and second components within the scope of the present disclosure. For example, first and second components 107, 108 may represent energy-storing/consuming assembly 52 and fuel supply 46 or other components of an energy producing and consuming assembly.

As schematically illustrated in FIG. 4, control system 80 includes first and second control loops 110 and 112. Both control loops may (but are not required to) share a common sensor output line 114 that receives a signal representative of a pressure P of the fuel stream 66 from a gauge 116, or other sensor, associated with the stream. The control configuration given is shown simplistically, and can be realized or otherwise implemented in various forms. For instance, separate lines and/or sensors may be used. As described above, control system 80 may be adapted to detect the pressure at fuel cell stack 24, the pressure of the fuel stream 66, the pressure of the discharge stream 54, or other variables of the energy producing and consuming assembly.

In some examples according to the present disclosure, sensor output line 114 may be coupled to first and second reference devices 118 and 120. Each reference device may be any appropriate circuit or logic unit adapted to generate an error signal. Reference devices may be optional. Examples of reference devices may include adders, subtractors, comparators, difference amplifiers, and the like. When included, reference devices 118 and 120 may receive reference signals on respective reference signal lines 122 and 124. For reference device 118, the reference signal may include a set, or determined, value associated with fuel source 46, which value may be referred to as a pressure $P_{FS}$. For reference device 120, the reference signal may be a set value associated with fuel cell stack 24, which value may be referred to as a pressure $P_{FC}$. When control system 80 is configured to be in communication with other components of the energy producing and consuming assembly, the reference devices and set values may be associated with different components and may include variables other than pressure. The difference between the sensed pressure signal on line 114, and the set value pressure $P_{FS}$, may be determined by device 118. The difference may then be output as an error signal on an error signal line 126. Similarly, the difference between the sensed pressure signal on line 114, and the set value for pressure $P_{FC}$, may be determined by device 120, and may be output as an error signal on an error signal line 128.

In some examples of energy producing and consuming assemblies, the respective error signals may be applied to a first signal processor 130 associated with functional unit 107, and a second signal processor 132 associated with functional unit 108. These signal processors may be coupled to the associated functional units by respective control signal lines 134 and 136. Each signal processor may include any appropriate device that utilizes an input signal, representative at least in part of a controlled variable, to derive a control signal on the associated control signal line appropriate for controlling the function of the associated functional component. Reference devices 118, 120, signal processors 130, 132, the various signal lines, and other components described as part of the control system 80 are representative of one configuration of the control system. Other configurations may be used to effectuate the control described herein, some of which may include greater or fewer sensors, processors, and other components.

Signal processors 130 and 132 may be adapted to modify the error signal in a manner representative of the desired effect of the error signal on the operation of the associated functional unit. For example, the signal processors may include one or more of a proportioning unit, an integrating unit, and a derivative unit. A proportioning unit may scale the value of the error signal by a particular factor that may be any appropriate value, such as a positive or negative non-zero value, a value less than one, equal to one, or greater than one. An integrating unit may accumulate the error signal over time, so the longer the error signal exists above zero or some reference, the greater the level of the control signal. A derivative unit on the other hand may produce a control signal that is representative of the rate of change of the error signal. In other words, when there is a rapid increase, for instance, in the error signal, then the control signal may be increased accordingly. These and other error signal characteristics may be, in combination, the basis for generating a control signal appropriate for controlling the associated functional unit, optionally based at least in part upon the transfer function of the corresponding functional unit. Optionally, other types of control techniques, such as rule-based control techniques, may also be used.

An input signal may include any signal appropriate for the signal processor to use to produce a control signal. Accordingly, signal processors may include any circuits or logic units or devices that produce the desired control signals. In some examples, signal processor 130 may receive as an input an error signal and may produce a control signal that is appropriate to control the stoichiometry of fuel production by fuel processor 64 from one or more input feedstocks in feed stream(s) 68. Similarly, signal processor 132 may produce a control signal that is appropriate to control the operation of fuel cell stack 24, such as by varying the oxidant input rate. As another example, signal processor 132 may be adapted to produce a control signal that is appropriate to control the production of electric current, and thereby the electrical power, by fuel cell stack 24 from fuel stream 66 and an oxidant stream. Active control of the production of electric current may be accomplished, for example, by applying the control signal to a load-regulating device, such as a DC/DC converter, a DC/AC inverter, variable resistance components such as a resistance bay, or other components or devices included in energy-storing/consuming assembly 52.

For example, when the fuel stream 66 has a pressure above a threshold pressure $P_{FS}$, the controller may, through the sending of the appropriate control signal(s), direct an appropriate decrease in the production of fuel (which, as discussed, is often hydrogen gas) and/or an appropriate increase in the production of electric current in the fuel cell stack (such as by increasing the load applied to the stack). A reduction in fuel flow or an increase in the production of electric current may then result in a reduction of the pressure of the fuel stream below threshold pressure $P_{FS}$, by reducing the backpressure produced by fuel cell stack 24. This decrease in fuel stream pressure, then, may result in a reduction in the error signal on error signal line 126. The threshold values referred to herein may be any predetermined or preselected values, such as may be selected for a particular embodiment of fuel cell system 22, for a particular operation or degree of control, etc.

While optional and not required in all energy producing and consuming assemblies according to the present disclosure, a pressure relief valve 156 may be associated with fuel stream 66 as illustrated in FIG. 4. Pressure relief valve 156 may be configured to limit the pressure in the fuel stream to a maximum pressure $P_{RV}$. Maximum pressure $P_{RV}$ may represent a pressure above which the damage may occur to one or more components of the energy producing and consuming assembly. Alternatively or additionally, maximum pressure $P_{RV}$ may represent a pressure above which one or more components of the energy producing and consuming assembly operates undesirably in some other manner, such as less efficiently. With reference to FIG. 4, pressure relief valve 156 is illustrated as disposed before gauge 116. It is within the scope of the present disclosure that pressure relief valve 156 is disposed after gauge 116 or integrated with the gauge. Additionally, it is within the scope of the present disclosure that a pressure regulator may replace or be used in cooperation with pressure relief valve 156 to provide additional or different control over the pressure in fuel stream 66 and/or in fuel cell stack 24. Control system 80, including the measurement devices and locations and the set values input into the control system, may be adapted to account for the presence, absence, and/or location of the pressure relief valve or pressure regulator.

Correspondingly, when the fuel stream 66 has a pressure below the set value $P_{FS}$, the controller (again by sending the appropriate control signal(s)) may be adapted to increase the pressure in fuel stream 66 by reducing and/or limiting electrical power produced by fuel cell stack 24 (such as by decreasing the load applied to the fuel cell stack) and/or increasing the production of supply fuel. This reduction in the consumption of fuel or increase in the production of fuel may cause backpressure on fuel stream 66 to increase. This in turn, may reduce the error signal on error signal line 128. Therefore, by monitoring the value of a selected variable, in this example, the pressure of the hydrogen (or other fuel) stream produced by the fuel processor and consumed by the fuel cell stack, the control system may selectively control the energy producing and consuming assembly while the assembly is in an active operating state. As discussed above, monitoring the pressure of the hydrogen stream, the discharge stream, or the fuel cell stack, are just examples of variables that may be monitored. Other non-exclusive examples of variables that can be monitored were described previously.

Expressed in slightly different terms, by monitoring the pressure at the fuel cell stack (or a stream in fluid communication therewith) and selectively adjusting or otherwise controlling the operation of the energy producing and consuming assembly when the value of this variable exceeds (above or below), reaches or approaches one or more selected thresholds, the control system maintains the energy producing and consuming assembly in an active operating state when otherwise the assembly might have required transitioning to an idle or even shutdown operating state.

Additionally, such monitoring and control of the energy producing and consuming assembly may be adapted to allow the assembly to maintain a utilization rate in a predetermined range over a range of operating conditions by actively controlling one or more components of the energy producing and consuming assembly. For example, in some embodiments, control system 80 may be adapted to actively control energy-storing/consuming assembly 52 by varying the load applied to fuel cell stack 24. As discussed above, actively controlling the load applied to the fuel cell stack will control the consumption of fuel in the fuel cell stack and may be controlled to maintain the utilization rate in a predetermined range. In some examples of the energy producing and consuming assemblies of the present disclosure, control system 80 may additionally, or alternatively, be adapted to actively control fuel source 46 to control the production of supply fuel 66. Active control of both the energy-storing/consuming assembly 52 and the fuel source 46 may allow for quicker response times for small variations in operating conditions and for increased control over a broader range of operating conditions to better maintain a predetermined utilization rate or otherwise control one or more aspects of the energy producing and consuming assembly.

Figure 5:
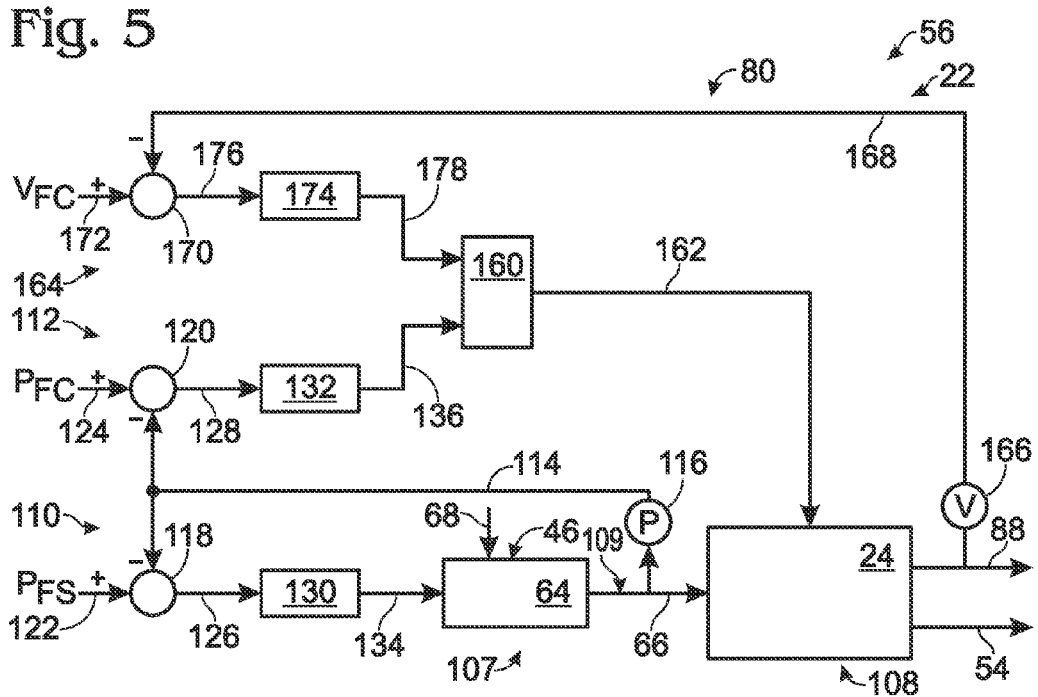
FIG. 5 is a schematic view of another example of an energy producing and consuming assembly as in FIG. 4.

Energy producing and consuming assembly 56 thus may provide control of one or more assembly functions that affect a variable such as the pressure of the fuel stream, the production of electric current, or other such variables. Additionally, control system 80 may be adapted to control two assembly functions that each affect a common variable, which in the illustrative example was associated with the fuel stream. Control system 80 also may be adapted to coordinate operation of one or more other functions based at least in part on a different variable, in conjunction with the single variable control just described. An example of such an energy producing and consuming assembly is illustrated in FIG. 5. For convenience, elements corresponding to elements shown in FIG. 4 have the same reference numbers.

Energy producing and consuming assembly 56 of FIG. 5 may include a fuel processor 64 that is adapted to produce, such as from at least one feed stream 68, a fuel stream 66 that provides fuel for a fuel cell stack 24. A control system 80 may include a control loop 110 in which the pressure P of the fuel stream (or the fuel cell stack, the discharge stream, or other component) is measured by a gauge 116 and communicated to a reference device 118. The difference between the pressure signal and a set value $P_{FS}$ received on a line 122, may be output as an error signal on a line 126. The error signal may be processed by a signal processor 130 to produce a control signal applied on a line 134 to fuel processor 64. Optionally, and similar to the above discussion in relation to FIG. 4, a pressure relief valve and/or a pressure regulator may be utilized between pressure gauge 116 and fuel cell stack 24, with the pressure relief valve or regulator being adapted to further regulate and/or control the pressure within the fuel cell stack, such as be defining or otherwise establishing a maximum pressure for the hydrogen stream being delivered to the fuel cell stack.

Controller 80 also may include a control loop 112 having a reference device 120 and an error signal processor 132. The error signal on line 128 may be based on the difference between the fuel stream pressure P and the fuel cell set value $P_{FC}$ received on a line 124. However, rather than applying the control signal produced on line 136 directly to the fuel cell stack (or the energy-storing/consuming assembly or other component), the pressure control signal may be applied to a logic unit 160. Logic unit 160, in this example, may be any circuit or device appropriate to select the minimum of two inputs, and to output the minimum on a control line 162 that then may be applied to the fuel cell stack. As another example, the logic unit may be adapted to select the maximum of two inputs and to output the maximum on control line 162 that is applied to the fuel cell stack.

In addition to control loops 110 and 112, control system 80 may include additional control loops, such as a third control loop 164. Control loop 164 may provide control of energy producing and consuming assembly 56 based on a second variable. For example, control loop 164 may be adapted to provide control of fuel cell stack 24 in a manner that maintains the output voltage above a set value or threshold, which may assist in protecting the fuel cell stack from damage that may occur during a low voltage condition. Accordingly, control loop 164 may include a voltmeter or other voltage-measuring sensor 166. A voltage sensor output signal may be applied to a voltage signal line 168 that may be applied to a control device, such as to a minus (negative) or inverting input of a third reference device 170. In such an embodiment, the control system (and/or controller) may be described as controlling the operation of the fuel cell system to maintain the pressure of the hydrogen (or other fuel stream) within selected threshold values and to maintain the output voltage from the fuel cell stack above a selected threshold.

As a continuation of this illustrative example, then, a voltage set value $V_{FC}$ may be applied to reference device 170 on a reference signal line 172. The resulting error signal may be transmitted to a signal processor 174 on an error signal line 176. The signal processor may process the signal, as described for signal processors 130 and 132, as appropriate for the desired control response desired, and produce a voltage control signal on a control signal line 178. The control signal line may transmit the voltage control signal to logic unit 160. As mentioned above, the lower of the voltage and pressure inputs may be selected and output on fuel cell stack control line 162 for controlling operation of the fuel cell stack. Optionally, similar techniques may be used to control other system parameters, such as temperature in one or more components, load applied to the fuel cell stack, feed rate of one or more feedstock streams, etc.

Figure 6:
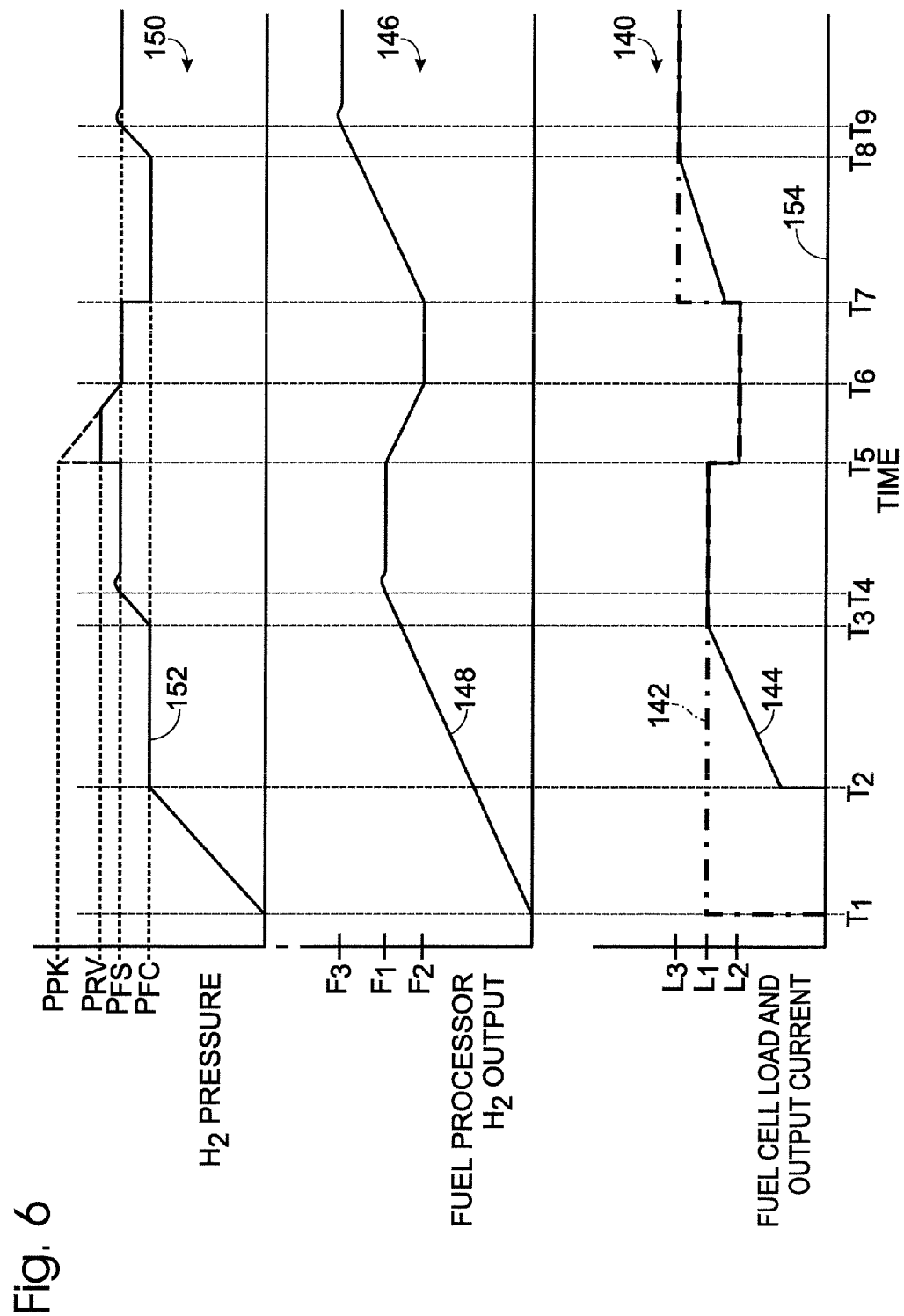
FIG. 6 is an exemplary graph of hydrogen pressure, reformer output, fuel cell stack load, and fuel cell output current for an exemplary energy producing and consuming assembly.

FIG. 6 depicts exemplary, idealized graphs showing how selected variables of an energy producing and consuming assembly may vary over time with, or be based on, changes in the load applied to the system. These graphs are presented as illustrative examples only, as actual assemblies may function differently. A lower graph 140 shows an example of fuel cell stack load 142 and fuel cell stack output electric current 144 as a function of time. Intermediate graph 146 depicts an example of hydrogen fuel flow 148, as output by a fuel processor 64 as a function of time. Upper graph 150 illustrates an example of the pressure 152 of the hydrogen fuel stream 66 (the fuel cell stack or the discharge stream) that may result from the operation of a fuel processor and fuel cell stack.

The three graphs have a common time axis 154 that identifies nine points in time, progressing from time $T_1$ through time $T_9$. Initially, the fuel processor and the fuel cell stack may be considered to be in an idle mode, or operating state, where they are ready to respond to an applied load, but are not presently producing (any, or more than a nominal amount of) hydrogen (or other fuel) or an electric current. By "nominal," it is meant the amount (if any) of hydrogen gas (or other fuel) or power required to maintain the fuel cell system in its idle operating state, these requirements being referred to as the balance-of-plant requirements of the system. It is assumed, for purposes of illustration, that little fuel is being produced by the fuel processor, that little current is being produced by the fuel cell stack, and that the pressure of any fuel in the fuel stream between the fuel processor and the fuel cell stack is near zero. The graphs shown in FIG. 6 are intended to illustrate how various factors, including changes in the load applied to the fuel cell stack, may affect selected variables of the energy producing and consuming assembly. The examples depicted in times $T_1$ through $T_9$ are illustrative examples only and are not required to occur in the illustrated sequence.

As schematically illustrated in FIG. 6 at a time $T_1$, an applied load $L_1$, such as an electrical and/or thermal load, may be applied to the fuel cell system. In response to the load, control system 80 may direct the fuel cell system into an active mode, or operating state, and fuel processor 64 may begin producing hydrogen fuel (or increase production from the nominal level produced in idle mode). This is represented by an increasing level of fuel flow from zero toward flow $F_1$. As the flow in fuel stream 66 begins increasing, the pressure of the stream increases accordingly, such as from zero toward a pressure $P_{FC}$, which may be representative of a minimum pressure for operation of the fuel cell stack. So long as there is insufficient pressure for the fuel cell stack to function safely, the fuel cell system may be configured to not produce electrical power. During this time, the applied load may be satisfied by energy-storage device 78 (when present in the fuel cell system).

When there is sufficient fuel flow to produce at least a selected, or threshold, fuel stream pressure $P_{FC}$, the fuel cell stack may begin producing electric current, as schematically illustrated in FIG. 6 at time $T_2$. Between times $T_2$ and $T_3$, the fuel flow 148 may continue to increase. With increasing fuel flow, the fuel cell stack may be able to produce increasing amounts of electric current, while keeping the fuel stream pressure at about the minimum level $P_{FC}$. In some examples, the fuel cell stack may have a relatively rapid response time, such as less than one second, in responding to a load change compared to the response time of the fuel processor, which may be longer, such as a minute or more. The response, though, may be limited by the requirement that the fuel stream pressure be maintained above the set value of $P_{FC}$. This may produce a relatively constant pressure during this time period.

As schematically illustrated in FIG. 6 at time $T_3$, the fuel cell stack output 144 may reach the applied load 142, with a load level $L_1$, at a fuel flow of less than $F_1$. Since the fuel processor may still be producing additional fuel and the fuel cell stack may be consuming fuel at a relatively constant rate, the fuel stream pressure may continue to rise. However, when the fuel pressure reaches the fuel processor set value of $P_{FS}$, the error signal for the signal processor 130 may become negative, and the controller may respond by limiting the rate of production of the fuel stream, such as to a flow $F_1$. At this flow, the consumption by the fuel cell stack may equal production, resulting in the fuel pressure staying at approximately or below pressure $P_{FS}$. There may be, but is not required to be, a nominal overshoot in the value of the pressure above pressure $P_{FS}$, which may be due to a relatively slower response time of the fuel processor. Once the pressure is reduced to below pressure $P_{FS}$, the system generally may stay in this steady state operating condition between times $T_4$ and $T_5$.

As schematically illustrated in FIG. 6 at time $T_5$, the applied load may decrease, such as from load $L_1$ to load $L_2$. Such a decrease in applied load may occur either through a change in the demand from external circuits or through instructions supplied by control system 80. Control system 80 may decrease the load applied to the fuel cell stack for a number of reasons, such as when energy-storage devices become fully charged or when the utilization rate is too high. When the load decreases, the fuel cell stack responds with a corresponding decrease in the production of electric current, which decreases the consumption of fuel. This may result in a sudden increase in the pressure of the fuel stream, as shown by the pressure increasing to a new maximum as the fuel processor continues to generate hydrogen gas (or the other fuel which it is adapted to produce). The pressure may continue to increase until it reaches a threshold pressure $P_{RV}$. Pressure $P_{RV}$ represents the release pressure for a relief valve 156 (or pressure regulator) connected to fuel stream 66, as shown in FIG. 4. The relief valve relieves excess pressure, preventing damage that could result if the pressure increased to a higher value, such as represented by a peak value $P_{PK}$, which is shown in dashed lines.

With continued reference to FIG. 6, as schematically illustrated between times $T_5$ and $T_6$, the applied load may stay constant, but the controller may be adapted to direct the fuel processor to produce continuously less fuel until the fuel stream pressure is brought back to or below pressure $P_{FS}$. As illustrated at time $T_6$, the pressure may reach $P_{FS}$, whereupon the controller may direct the fuel processor to maintain a constant rate of fuel production, which rate may be lower than the rate required to maintain the load $L_1$ between time T3 and time T4. Assuming the applied load does not change, the fuel stream pressure should stabilize or otherwise level off. As schematically illustrated in FIG. 6, this new steady-state condition may continue until time $T_7$.

As schematically illustrated in FIG. 6 at time $T_7$, the load 142 may increase to a new, higher level, such as level $L_3$. Due to the quick response of the fuel cell stack relative to the fuel processor, the fuel cell stack output may increase until the pressure in the fuel stream drops to fuel-cell-set value $P_{FC}$ and fuel processor 64 begins producing more fuel. As the fuel flow begins to rise, the fuel cell stack may increase the electric current produced, keeping the fuel stream pressure at about pressure $P_{FC}$. Again, similar to what occurred during the initial start-up period, a point may be reached at time $T_8$ where the fuel cell production matches the applied load $L_3$. With fuel production still increasing, the fuel stream pressure may rise until it reaches upper limit pressure $P_{FS}$. This may occur at a time $T_9$.

Once pressure $P_{FS}$ is reached, the fuel processor output may stabilize to maintain the fuel pressure at or below pressure $P_{FS}$. This steady-state condition then may continue until a further change in the load occurs.

As can be seen from the preceding discussion of FIG. 6, the operation of fuel supply 46 and fuel cell stack 24 may both affect the pressure at the fuel cell stack. Additionally, FIG. 6 illustrates that the applied load on fuel cell stack 24 may affect the operation of the fuel cell stack, the consumption of the fuel, and the pressures at the fuel cell stack. These relationships are further discussed in relation to FIGS. 7-10.

Figure 7:
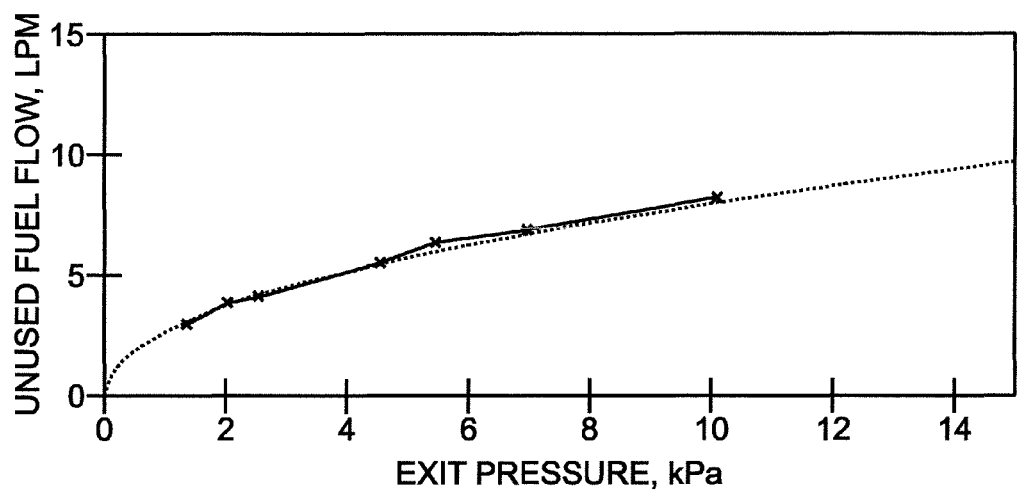
FIG. 7 is a graph of an example of unused fuel flow through a fuel cell exit orifice as a function of the detected pressure.

FIG. 7 is a graph of the flow, in liters per minute (L/min), of the unused fuel F2, either discharged through exit orifice 90 or accumulating in fuel cell stack 24, as a function of pressure of fuel cell stack 24 detected by control system 80, which may be exit pressure P2, in kPa, where k is the numerical prefix kilo, and Pa is the unit for pressure, Pascals. The points on the graph indicated by an "x" and connected by solid line segments represent empirical values. The dotted line represents the equation $F=K\sqrt{P}$, where K=2.53 (L/min)/(sqrt(kPa)) in this example. It is seen that the approximate formula works well to determine flow based on the detected pressure. Accordingly, by use of this formula, as an example, control system 80 may be adapted to detect the pressure of fuel cell stack 24, and to determine the flow F2 of unused fuel based on the detected pressure. As discussed above, exit pressure P2 is one example of the pressure that may be detected; the detected pressure may also be the inlet pressure or other pressure at the fuel cell associated with the accumulation or flow of unused fuel. As used herein, "based on" is meant to neither exclude nor require additional factors. Accordingly, "based on" should be construed to include "based at least in part on" one or more indicated factors, but not to require additional factors. For example, a control system that utilizes the above formula to determine flow based on the exit pressure may, but is not required to, also utilize other factors in this determination. The same applies to the other "based on" relationships described and/or claimed herein. Similarly, "in response to" is meant to neither exclude nor require additional factors that may trigger the response.

In at least some fuel cell stacks, the flow F3 of fuel consumed by the fuel cell stack has been determined to be directly proportional to the electric current output of the fuel cell stack, here represented as Ifc. In this case, then, the flow is determined by the equation F3=b·Ifc. Although the value of "b" depends on the operating characteristics of the individual fuel cell stack, in some fuel cell stacks, the value of b may be less than 1, and in particular, a value of 0.589 has been determined to be reasonably accurate for some fuel cell stacks.

In some examples of fuel cell stacks 24, ranges of operating parameters may be established. The following operating parameters apply to some exemplary fuel cell stacks constructed and operated according to the present disclosure. It is within the scope of the disclosure that other operating parameters may be utilized or may otherwise apply. As illustrative examples, the maximum and minimum current ranges for a particular stack may be greater or less than the values presented below.

| Parameter | Maximum | Minimum |
|---|---|---|
| Fuel Inlet Pressure Range (gauge): | 12 kPa | 0.8 kPa |
| Air Inlet Pressure Range (gauge): | 6.21 kPa | 0.3 kPa |
| Fuel/Air Delta Range (differential): | 11.7 kPa | 0.5 kPa |
| Fuel Utilization: | 83% | 70% |
| Stack Current Range: | 70 A | 20 A |

As indicated above, the flow F1 of fuel into the fuel cell stack may be determined by summing the flow F2 out of the exit orifice or building up in the fuel cell stack and the flow F3 consumed by the fuel cell stack. Using the above equations, the unused fuel flow F2 may be determined from the detected pressure P2, and the consumption flow F3 may be determined from the fuel cell current Ifc. In equation form, $F1=b \cdot Ifc+K\sqrt{P2}$. This function defines a surface of points in a space having as axes, supply fuel flow, fuel cell current, and exit pressure.

Utilization, U, of the fuel by the fuel cell stack may be defined as the proportion of the supply fuel flow F1 that is used for production of electric current, or $$U = \frac{F3}{F1} = \frac{F3}{F2+F3} = \frac{b \cdot Ifc}{b \cdot Ifc + K\sqrt{P2}}.$$

From this equation, it can be seen that in order to achieve a controlled utilization level for a given fuel cell electric current production, active control over the exit pressure may be implemented. Alternatively, a controlled utilization rate for a given exit pressure may be achieved by actively controlling the fuel cell current Ifc. In some energy producing and consuming assemblies, it may be preferred to control the utilization rate to prevent contaminating the fuel cell stack by over-utilization and to prevent wasted fuel by under-utilization.

Figure 8:
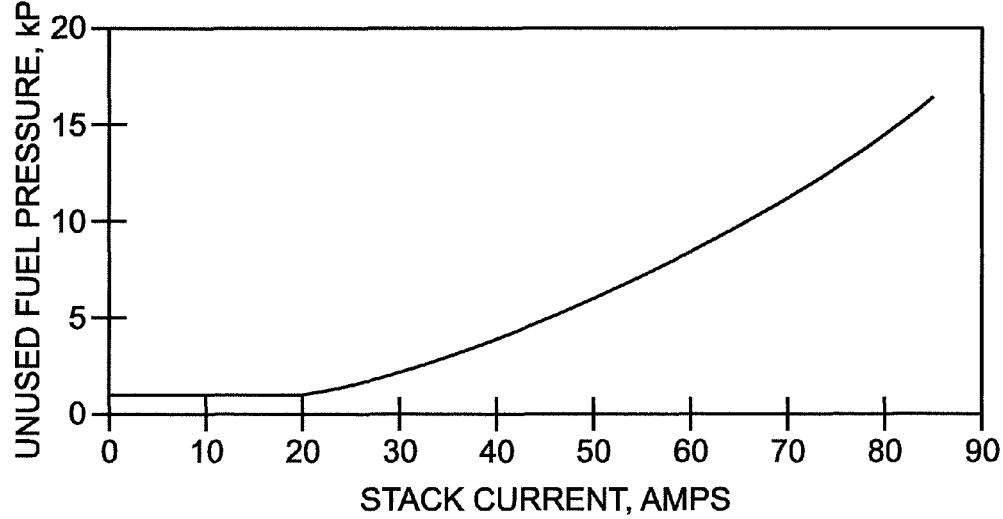
FIG. 8 is a graph of an example of target unused fuel pressures detected at the fuel cell stack as a function of a fuel cell stack current.

FIG. 8 is a graph of exit pressure as a function of stack current for an illustrative utilization level of 83% for a fuel cell stack constrained by the ranges of operating parameters listed above. Other utilization levels would produce different curves, and other fuel cell stacks would have different operating characteristics. It is within the scope of the present disclosure that other utilization levels may be used, such as levels in the range of 83-100%, in the range of 80-85%, in the range of 70-83%, in the range of 50-70%, in the range of 70-90%, less than 70%, less than 50%, greater than 70%, greater than 80%, greater than 90%, approximately 83%, etc.

Figure 9:
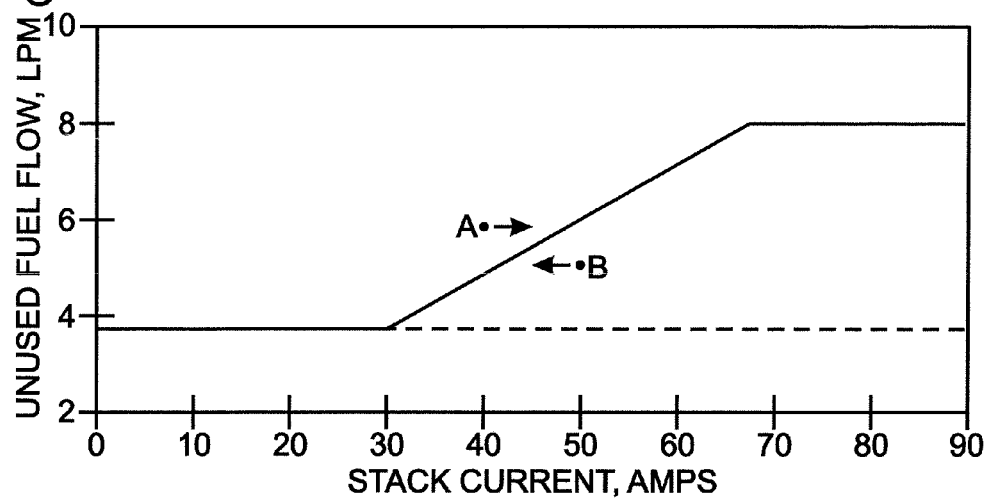
FIG. 9 is a graph of unused fuel flow as a function of stack current when the fuel utilization is maintained at a predetermined utilization rate and when the detected pressure is maintained within the range of detected pressures depicted in FIG. 7.

FIG. 9 is a graph of selected set values of unused fuel flow as a function of stack current for the operating conditions corresponding to FIG. 8 and an illustrative utilization level of 83%. It is seen in this example that the unused fuel flow increases linearly with stack current through the normal operating range of an illustrative fuel cell stack, i.e., approximately 30 and 68 amps. The set values of unused fuel flow of unused fuel are constrained between the limits of about 3.6 lpm (liters per minute) and 8.0 lpm, corresponding to a minimum exit pressure of 2 kPa and a maximum exit pressure of 10 kPa.

Figure 10:
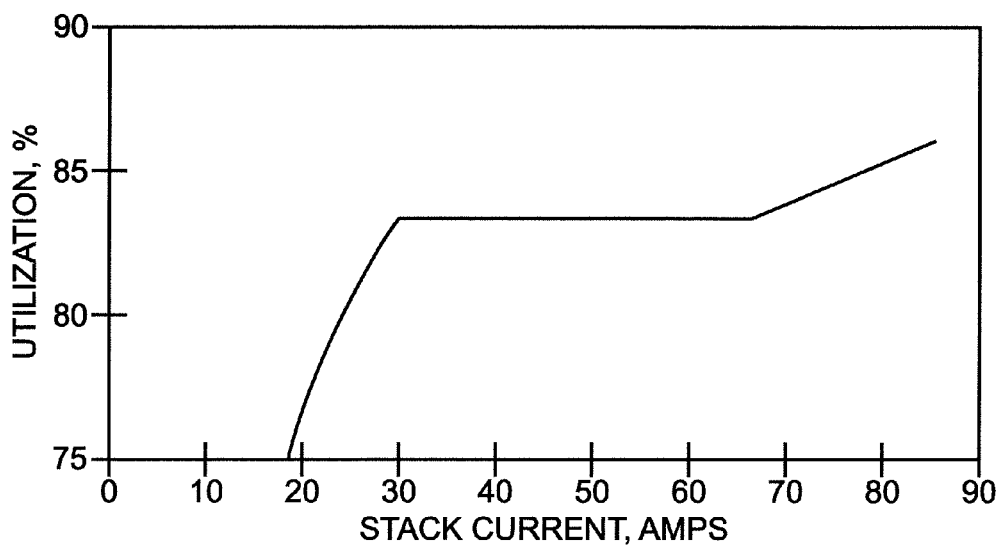
FIG. 10 is a graph of the utilization of fuel in the fuel cell stack as a function of stack current when the detected pressure at the fuel cell stack is maintained within the range of detected pressures depicted in FIG. 7.

FIG. 10 is a graph of hydrogen utilization as a function of stack current for the same illustrative operating conditions. The utilization is maintained at 83% over the normal operating range of the fuel cell stack. In this example, the utilization drops off (i.e., decreases) for a stack current of less than approximately 30 amps, and rises relatively linearly above approximately 68 amps.

These illustrative figures demonstrate that the unused fuel flow F2 is proportional to the stack current for a constant utilization of 83%. By adjusting stack current (consumption) to hold exit flow F2 on the Exit Flow F2 curve of FIG. 9, stack hydrogen utilization is maintained at 83% over a large portion of the stack operating range. At the stack current of 78 amps, utilization is just hitting 85%.

In one illustrative scenario, the unused fuel flow may be about 6 LPM (as calculated from the above equations and the detected pressure) and the stack current may be about 40 amps at a particular moment in time; the conditions are illustrated graphically as point A. As discussed above, the target, or selected, utilization rate is represented by the solid line. In order to move point A to the solid line, the stack current may be increased or the exit flow may be decreased. Accordingly, the load applied to the stack may be increased to control the utilization rate to the target rate. An example of the opposite scenario is represented graphically by point B in FIG. 9, at which point the unused fuel flow may be about 5 LPM and the stack current may be about 50 amps. To restore the energy producing and consuming assembly to the target utilization rate, the energy-storing/consuming assembly may be actively controlled to decrease the load on the fuel cell stack thereby decreasing the utilization rate. Due to the relatively quicker response time of the fuel cell stack to changes in applied load, as compared to the response time of the supply fuel to changes in the fuel processor, changing the applied load may be preferred for small or temporary changes in operating conditions. However, active control of the applied load may be difficult to maintain for long periods of time or for large changes in operating conditions. Accordingly, in some embodiments it may be preferred to actively control both the applied load and the fuel source.

Control of fuel cell stack 24 and/or fuel source 46 by control system 80 may be accomplished, at least in part, using these various values and relationships. The exit pressure identified in the graph of FIG. 8 may be used as a target pressure for the supply of fuel to the fuel cell stack. This pressure may also be referred to as a target exit pressure or target detected pressure. The relationship illustrated incorporates fuel flow consumed in the fuel cell stack as well as unused fuel that is discharged. These relationships are derived from the outlet or exit pressure and the stack current. Other parameter relationships may also be derived.

As has been discussed, the various control parameters may be used in different ways to control various components of fuel cell system 22. For example, the exit fuel flow, and correspondingly, the exit pressure, provide an indication of the amount of fuel provided by fuel source 46. Operation of the fuel source, and in particular the stoichiometry of the fuel processor, may be based on this information. Further, the air supply and fuel cell may be controlled to provide a supply pressure that will result in a desired utilization of the fuel. Production of supply fuel and fuel cell exit pressure may be adjusted to provide a desired supply pressure. Also, the exit orifice may be adjusted to vary the exit flow and/or exit pressure. Accordingly, by maintaining a target pressure for the supply fuel for a given stack current, the fuel utilization may be maintained at a desired level.

The desired utilization rate may also be controlled in a predetermined range by actively controlling the energy-storing/consuming assembly 56 and the load applied to the fuel cell stack. Similarly, the desired utilization rate may be maintained by actively controlling the electric current produced by the fuel cell stack. In some embodiments, active control of the energy-storing/consuming assembly 56 may be combined with active control of the fuel source to provide greater control. The active control of the energy-storing/consuming assembly 56 may provide quicker response times and greater accuracy in the control while the active control of the fuel source may allow for control of the utilization rate over a larger range of operating conditions. Active control of the fuel source may be preferred for prolonged variations in externally applied loads or for prolonged changes in the conditions of the energy producing and consuming assembly.

The above operating states and subroutines have been presented to provide examples of how the control system may automate the operation of fuel cell system 22 and/or energy producing and consuming assembly 56. The examples provided above should not be construed in a limiting sense, as many variations of the operating characteristics, parameter values, and fuel cell system design and configuration are possible without departing from the scope of the present disclosure.

INDUSTRIAL APPLICABILITY

Fuel cell systems and control systems described herein are applicable in any situation where power is to be produced by a fuel cell stack. It is particularly applicable when the fuel cell stack forms part of a fuel cell system that includes a fuel processing assembly that provides a feed for the fuel cell stack.

The automation of fuel cell system 22 enables it to be used in households, vehicles and other commercial applications where the system is used by individuals that are not trained in the operation of fuel cell systems. It also enables use in environments where technicians, or even other individuals, are not normally present, such as in microwave relay stations, unmanned transmitters or monitoring equipment, etc. Control system 80 also enables the fuel cell system to be implemented in commercial devices where it is impracticable for an individual to be constantly monitoring the operation of the system. For example, implementation of fuel cell systems in vehicles and boats requires that the user does not have to continuously monitor and be ready to adjust the operation of the fuel cell system. Instead, the user is able to rely upon the control system to regulate the operation of the fuel cell system, with the user only requiring notification if the system encounters operating parameters and/or conditions outside of the control system's range of automated responses.

The above examples illustrate possible applications of such an automated fuel cell system, without precluding other applications or requiring that a fuel cell system necessarily be adapted to be used in any particular application. Furthermore, in the preceding paragraphs, control system 80 has been described controlling various portions of the fuel cell system. The system may be implemented without including every aspect of the control system described above. Similarly, system 22 may be adapted to monitor and control operating parameters not discussed herein and may send command signals other than those provided in the preceding examples.

It is believed that the disclosure set forth above encompasses multiple distinct methods and/or apparatus with independent utility. While each of these methods and apparatus has been disclosed in its preferred form, the specific examples thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that correspond to disclosed examples and are novel and non-obvious. Other combinations and subcombinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

The invention claimed is:

1. An energy-producing and consuming assembly, comprising:
   a fuel source configured to provide a supply fuel stream at a supply pressure;
   a detector configured to detect the supply pressure;
   a supply fuel pressure regulator configured to receive the supply fuel stream and to produce therefrom a pressure-regulated fuel stream at a regulated pressure;
   a fuel cell stack configured to receive the pressure-regulated fuel stream and an oxidant stream and to produce therefrom an electric current at a production amperage to satisfy an electrical load;
   a load-regulating device configured to selectively control a magnitude of the electrical load; and
   a controller programmed to selectively control the production amperage based on the detected supply pressure by actively controlling the load-regulating device, wherein the controller is programmed to at least one of increase the electrical load responsive to detecting that the supply pressure is greater than an upper threshold pressure and decrease the electrical load responsive to detecting that the supply pressure is less than a lower threshold pressure.

2. The assembly of claim 1, wherein the load-regulating device includes at least one of a DC/DC converter and a DC/AC inverter.

3. The assembly of claim 1, wherein the assembly further includes a hydrogen storage device configured to receive the supply fuel stream from the fuel source, to store at least a portion of the supply fuel stream at least temporarily as a stored supply fuel stream, and to provide the stored supply fuel stream to the supply fuel pressure regulator.

4. The assembly of claim 3, wherein the hydrogen storage device includes at least one of a pressurized tank and a hydride bed.

5. The assembly of claim 3, wherein the hydrogen storage device is configured to store the stored supply fuel stream at a storage pressure that is equal to the supply pressure.

6. The assembly of claim 1, wherein the detector is located between the fuel source and the pressure regulator.

7. The assembly of claim 1, wherein the controller is programmed to control the production amperage to maintain the supply pressure above the lower threshold pressure.

8. The assembly of claim 1, wherein the controller is programmed to control the production amperage to maintain the supply pressure below the upper threshold pressure.

9. The assembly of claim 1, wherein the controller is further programmed to control the production amperage to maintain an output voltage from the fuel cell stack above a threshold voltage.

10. The assembly of claim 1, wherein the assembly is configured to at least one of continuously discharge and intermittently discharge an unused fuel stream from the fuel cell stack through an exit orifice at an exit pressure.

11. The assembly of claim 1, wherein the supply fuel pressure regulator is configured to maintain the regulated pressure below a threshold regulated pressure.

12. The assembly of claim 1, wherein the fuel source includes a hydrogen producing region configured to produce the supply fuel stream from a feed stream, and further wherein the controller is programmed to control the production of supply fuel by the hydrogen producing region to maintain the supply pressure below the upper threshold pressure.

13. The assembly of claim 12, wherein the controller is programmed to control the production amperage to maintain the supply pressure above the lower threshold pressure that is less than the upper threshold pressure.

14. An energy-producing and consuming assembly, comprising:
   a fuel source configured to provide a supply fuel stream at a supply pressure;
   a detector configured to detect the supply pressure;
   a supply fuel pressure regulator configured to receive the supply fuel stream and to produce therefrom a pressure-regulated fuel stream at a regulated pressure;
   a fuel cell stack configured to receive the pressure-regulated fuel stream and an oxidant stream and to produce therefrom an electric current at a production amperage to satisfy an electrical load;
   a load-regulating device configured to selectively control a magnitude of the electrical load; and
   means for selectively controlling the production amperage based on the detected supply pressure by actively controlling the load-regulating device, wherein the means for selectively controlling at least one of:
   (i) increases the electrical load responsive to detecting that the supply pressure is greater than an upper threshold pressure; and
   (ii) decreases the electrical load responsive to detecting that the supply pressure is less than a lower threshold pressure.

15. A method of operating the energy-producing and consuming assembly of claim 1, the method comprising:
   producing the supply fuel stream at the supply pressure;
   regulating the regulated pressure of the supply fuel stream with the pressure regulator to produce a pressure-regulated supply fuel stream;
   applying the oxidant stream and the pressure-regulated supply fuel stream to the fuel cell stack;
   applying the electrical load to the fuel cell stack with the load-regulating device;
   satisfying at least a portion of the electrical load with the fuel cell stack;
   detecting the supply pressure with the detector; and
   controlling, with the controller, the production amperage by actively controlling the electrical load applied to the fuel cell stack by the load-regulating device based on the detected supply pressure.

16. The method of claim 15, wherein the controlling includes increasing the electrical load responsive to detecting that the supply pressure is above the upper threshold pressure.

17. The method of claim 15, wherein the controlling includes decreasing the electrical load responsive to detecting that the supply pressure is below the lower threshold pressure.

18. The method of claim 15, wherein the method includes storing at least a portion of the supply fuel stream in a hydrogen storage device as a stored supply fuel stream, and the method further includes providing the stored supply fuel stream to the pressure regulator.

19. The method of claim 15, wherein the load-regulating device includes at least one of a DC/DC converter and a DC/AC inverter, and further wherein the controlling includes controlling the production amperage by controlling the operation of the at least one of the DC/DC converter and the DC/AC inverter.

\* \* \* \* \*